United States Patent [19]

Ikeda

[11] 4,437,028

[45] Mar. 13, 1984

[54] ARMATURE WINDING FOR A DC MULTI-POLE MOTOR

[76] Inventor: Kenske Ikeda, Room No. 3, Midori-so, 10-3, Chuorinkan 6-chome, Yamato-shi, Kanagawa-ken, Japan

[21] Appl. No.: 265,197

[22] Filed: May 19, 1981

Related U.S. Application Data

[63] Continuation of Ser. No. 32,482, Apr. 23, 1979, abandoned.

[30] Foreign Application Priority Data

Apr. 25, 1978 [JP] Japan ................... 53-49133

[51] Int. Cl.³ ............................................. H02K 3/00
[52] U.S. Cl. ...................................... 310/198; 310/46; 310/234; 310/266
[58] Field of Search ............... 310/46, 177, 40 MM, 310/233, 234, 179, 266, 198–208, 171, 156, 195, 310/268, 180, 184, 248

[56] References Cited

U.S. PATENT DOCUMENTS

| | | | |
|---|---|---|---|
| 2,552,863 | 5/1971 | Petit | 310/195 |
| 3,356,877 | 12/1967 | Burr | 310/268 |
| 4,103,196 | 7/1978 | Saito | 310/266 |
| 4,107,587 | 8/1978 | Ban | 310/202 |
| 4,123,679 | 10/1978 | Miyasaka | 310/40 MM |
| 4,197,475 | 4/1980 | Ban | 310/266 |
| 4,200,971 | 5/1980 | Shimizu | 310/266 |
| 4,227,107 | 10/1980 | Ban | 310/46 |

Primary Examiner—R. Skudy
Attorney, Agent, or Firm—Fisher, Christen & Sabol

[57] ABSTRACT

This invention provides a DC multi-pole electrodynamic device, specifically a cup type DC multi-pole coreless motor having fixed field magnets, a magnetic material for closing the magnetic circuits of the field magnets, an armature composed of armature coils constructed of a plurality of loops, each having successive active armature portions adjacent to successive ones of said fixed magnetic field poles, respectively, the armature coils being formed by winding a conductor in substantially the same circumferential direction a predetermined number of times, the armature coils being formed by winding said conductor periodically in opposite axial directions with respect to magnetic poles without forming adjacent physically closed coils, the armature having coil taps equal to half the number of magnetic pole pieces, a commutator having commutator segments electrically connected to said coils, and a set of two fixed brushes.

6 Claims, 7 Drawing Figures

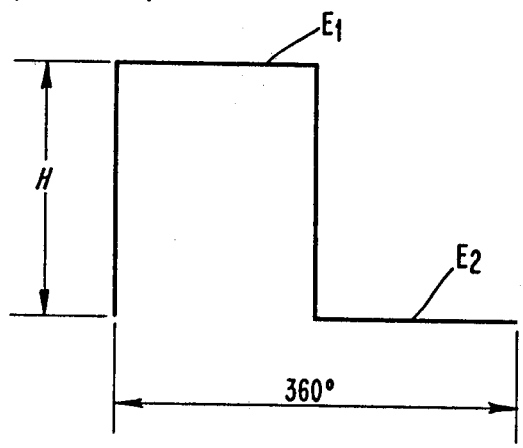
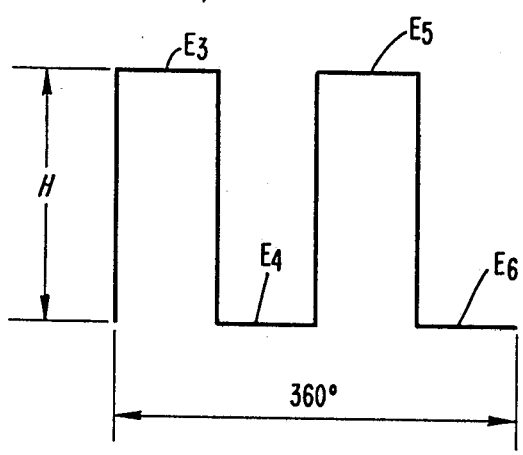
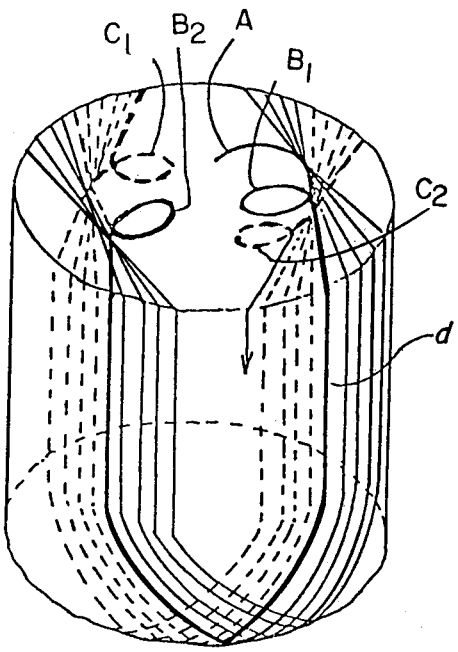
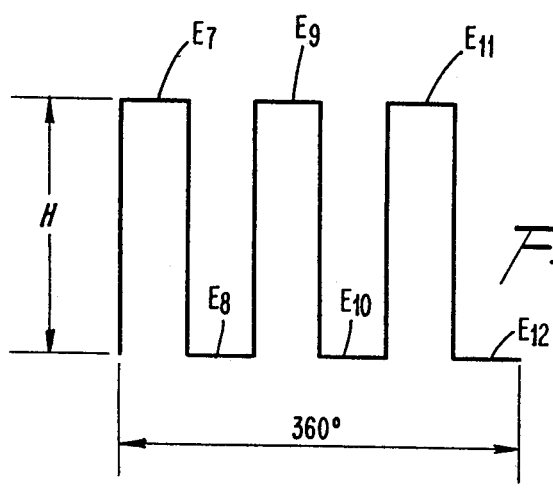

ARMATURE WINDING FOR A DC MULTI-POLE MOTOR

This is a continuation of application Ser. No. 32,482, filed Apr. 23, 1979, now abandoned.

BACKGROUND OF THE INVENTION

1. Field of the Invention

This invention relates to a DC multi-pole electrodynamic device, more particularly to a cup type DC multi-pole coreless motor.

2. Description of the Prior Art

The armatures for electrodynamic devices, such as cup type DC coreless motors, now commercially available have such a poor efficiency that the permanent magnet with high magnetic field strength such as those made of alnico or rare earth metal are used especially for a micro motor to compensate for the lower efficiency of the armature. This results in limiting their applications, as well as making the motors more expensive to manufacture.

The problems to be solved, especially for a DC multi-pole motor are: that the multi-pole motor is expensive to manufacture due to difficulties in winding a conductor sequentially on the armature to form armature coils; a large number of motor components such as brushes or additional external connecting lines between coils or commutator segments located symmetrically in the magnetic field in addition to difficulties in the connecting procedure; and, consequently, the difficulties in assembling the components.

SUMMARY OF THE INVENTION

Accordingly, it is an object of the present invention to provide a highly efficient DC multi-pole electrodynamic device, especially a cup type DC multi-pole coreless motor by an improved combination of fixed field magnets, a magnetic material for closing the magnetic circuits of field magnets, armature coils, armature coil taps, a commutator, and brushes.

It is another object of the present invention to provide a cup type DC multi-pole coreless motor, particularly a micro motor, which is simplified in construction and can be manufactured at lower cost in addition to its higher efficiency.

These and other objects and advantages of the present invention will become manifest upon an examination of the following description and the accompanying drawings.

BRIEF DESCRIPTION OF THE DRAWINGS

FIG. 1 is a planar development of a conductor loop for armature coils in a cup type DC two-pole coreless motor.

FIG. 2 is a planar development of a conductor loop for armature coils in a cup type DC four-pole coreless motor.

FIG. 3 is a planar development of a conductor loop for armature coils in a cup type DC six-pole coreless motor.

FIG. 4 is a perspective view of a partially wound armature coil and coil taps for a cup type DC four-pole coreless motor according to the present invention.

DESCRIPTION OF THE PREFERRED EMBODMENTS

Figure 5:
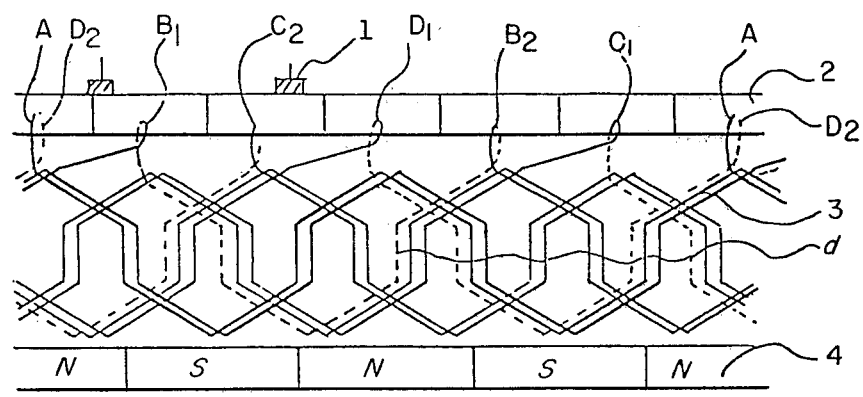
FIG. 5 is an expanded view of magnetic poles, armature windings, armature coil taps, a commutator, and brushes for a cup type DC four-pole coreless motor according to the present invention, wherein windings from $B_1$ to $B_2(d)$, $C_1$ to $C_2$, and $D_1$ to $D_2$ are shown by dotted lines respectively.

The present invention provides multi-pole electrodynamic devices, especially cup type DC multi-pole coreless motors comprising fixed field magnets, a magnetic material for closing magnetic circuits of said field magnets, an armature, a commutator, indicated by numeral 2 and a set of two fixed brushes, indicated by numeral 1, slidably contacting said commutator.

The armature is composed of armature coils, indicated by numeral 3 constructed of a plurality of loops, each having successive active armature portions adjacent to successive ones of said fixed magnetic field poles, respectively. The armature is formed by winding a conductor in loop fashion in substantially the same circumferential direction a predetermined number of times. The armature coil are formed by winding the armature conductor periodically in substantially opposite axial directions with respect to magnetic poles, indicated by numeral 4 without forming adjacent physically closed coils. The armature has coil taps equal to $$\tfrac{1}{2}PZ$$

wherein P is the number of poles and Z is the number of coils. A coil being defined as a number of turns of a conductor having taps at each end of the coil to complete an electrical circuit through said conductor. The commutator has mutually insulated sequential commutator segments which are individually electrically connected to coil taps in situ in a sequential way not by hand.

The term "multi-pole" means four or more North-South field poles.

The electrodynamic device according to the present invention includes an iron core motor or generator, a disc type coreless motor or generator, a cup type coreless motor or generator, and the like.

The magnetic material is annular shaped for the cup type and circular shaped for the disc type devices.

The armature is a hollow cylindrical shape for the cup type, and flat circular shaped for the disc type devices.

A permanent field magnet with a high magnetic field strength such as those made of alnico or rare earth metal may be used, although they are more expensive.

The ferrite magnet, which is inexpensive and readily available, may be used as the field magnet by employing a multi-pole system in spite of its lower magnetic field strength.

The following expanation shows how a highly efficient cup type DC coreless motor is obtained by employing a multi-pole system.

The conductor forming armature coils has an active portion extending generally in the axial direction with respect to the armature axis, and an inactive head portion oriented in a plane perpendicular to the armature axis. The active conductor portions produce torque but the inactive conductor portions (hereinafter referred to as coil ends) do not produce torque when current passes therethrough.

The efficiency of the motor can be improved by decreasing the ratio of the coil end to the active conductor portion. And the above ratio is best decreased by employing a multi-pole system. This will be explained more clearly hereinafter.

Although this is roughly true regardless of shape of each conductor loop, that is, in any case where the active conductor portion is inclined or parallel to the axis, the following explanation will be given in the case where the active conductor portion is parallel to the axis and the coil end extends along a peripheral line both on top and bottom surfaces of the cup perpendicular to the axis as shown in FIGS. 1 to 3.

As shown in FIGS. 1 to 3, the total length of the coil ends equals to the peripheral length of the armature regardless of the number of the magnetic poles. Therefore, the number of active conductor portions per unit length of the coil end is increased as the number of megnetic poles is increased.

That is, the ratio of the coil end to the active conductor portion is decreased as the number of magnetic poles is increased resulting in improving the efficiency of the armature, and consequently, of the motor.

The ratios Y2, Y4, and Y6 of coil ends to active conductor portions for two-pole, four-pole and six-pole systems respectively are represented in the following equations respectively:

$$Y_2 = \frac{E_1 + E_2}{2H} = \frac{\pi D}{2H}$$

$$Y_4 = \frac{E_3 + E_4 + E_5 + E_6}{4H} = \frac{\pi D}{4H}$$

$$Y_6 = \frac{E_7 + E_8 + E_9 + E_{10} + E_{11} + E_{12}}{6H} = \frac{\pi D}{6H}$$

wherein D represents the diameter of the armature, H represents the height of the armature, $\pi$ is the ratio of the circumference of a circle to its diameter, and EI to EI2 represent coil ends, respectively.

It is shown that the ratios of coil ends to active conductor portions for four-pole and six-pole systems are reduced to one half and one third that of two-pole system respectively.

In the case where the active conductor portion is inclined to the axis of the armature, the number of conductor loops within a given thickness on the armature will be directly proportional to sin $\alpha$, in which $\alpha$ represents an angle at which the active conductor is inclined to a plane perpendicular to the axis.

As the valve of $\alpha$ approaches 90°, the number of loops wound will be increased, and it is desirable that the conductor is parallel to the axis for armature coils crossing the magnetic field to produce torque effectively.

And as the number of magnetic poles is increased, the value of $\alpha$ approaches 90° resulting in increasing the number of conductor loops to be wound within a given armature size. On the other hand, a conductor wire loss may be reduced by using a conductor of a larger diameter, assuming the number of conductor loops are constant.

FIG. 4 is a perspective view of armature coils and armature coil tap arrangements for a cup type DC four-pole coreless motor according to the present invention. In FIG. 4, an armature conductor winding is started at point A as shown by a solid line, and extends generally perpendicularly to the radial direction on the closed end surface of the armature cup and than extends generally axially, along the cylindrical surface of the cup to form active conductor portions thereon, being extended to the bottom of the cup. Further, the conductor is extended in the same manner as above adjacent to the next successive magnetic fuild pole to form a conductor loops located periodically to field magnets.

Thus, the above conductor loop is further wound sequentially as many times as required to obtain a predetermind r.p.m. of the motor design. At the end of this winding procedure, a coil tap is formed at $B_1$.

Then the conductor is further extended to an adjacent magnetic pole. Since the magnetic polarity of the adjacent pole changes, the axial direction of the winding is also changed to form another coil tap at the position of $B_2$. The above conductor is shown in FIG. 4 extended to an adjacent position identical in magnetic phase preferably along the loop by a heavy line d to form another coil tap at the position $B_2$. Further, the conductor is wound as shown by a dotted line to form a set of two coil taps at the positions of $C_1$ and $C_2$ respectively.

The procedure is repeated a predetermined number of times to form additional sets of taps and coils such as taps $D_1$ and $D_2$ shown in FIG. 5. Finally the conductor returns to the position of A where it is electrically connected thereto.

It is seen the conductor d, which is formed as shown and discussed as a conductive winding, has thereby been extended to a position identical in magnetic phase.

The term predetermined number of times means the number of coils which depends on the number of commutator segments which corresponds to the number of rectified waves required for the quality of the motor, and equals the number determined by dividing the number of commutator segments by half the number of magnetic field poles, being preferably an odd number for four-pole system to produce a normal rotation with uniformity in torque. Thus a DC four-pole motor with a set of two brushes can be obtained. The same result may be obtained in the coil formation procedure in the order of A, $B_1$, $B_2$, $C_2$, $C_1$, A as in the order of A, $B_1$, $B_2$, $C_1$, $C_2$, A as shown in FIG. 4.

It is well-known in the prior art to form coil taps for each coil loop. However, according to the present invention, coil taps equal to half the number of magnetic field poles are formed for each armature coil.

FIG. 5 shows the conductor d indicated as a dotted line; two other conductors, unnumbered, are shown in dotted lines connecting tap $D_1$ and $D_2$, $C_1$ and $C_2$, respectively, and have the same function as conductor d, discussed herein.

That is, the number of coil taps T is represented by the following equation, $$T = \tfrac{1}{2}PZ$$

wherein P represents the magnetic field poles, and Z is the number of coils.

Therefore, according to the present invention, it is composed of six commutator segments, three coils, six coil taps and a set of two brushes by forming two coil taps for each armature coil in the case of a DC four-pole coreless motor.

Figure 6:
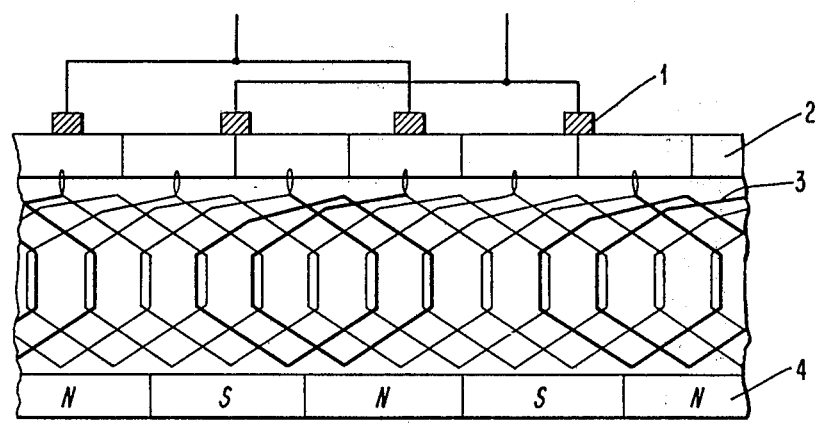
FIG. 6 is an expanded view of field magnets, armature windings formed in accordance with so-called lap winding arrangement, armature coil taps, a commutator, and brushes for a prior art cup type DC four-pole coreless motor.
Figure 7:
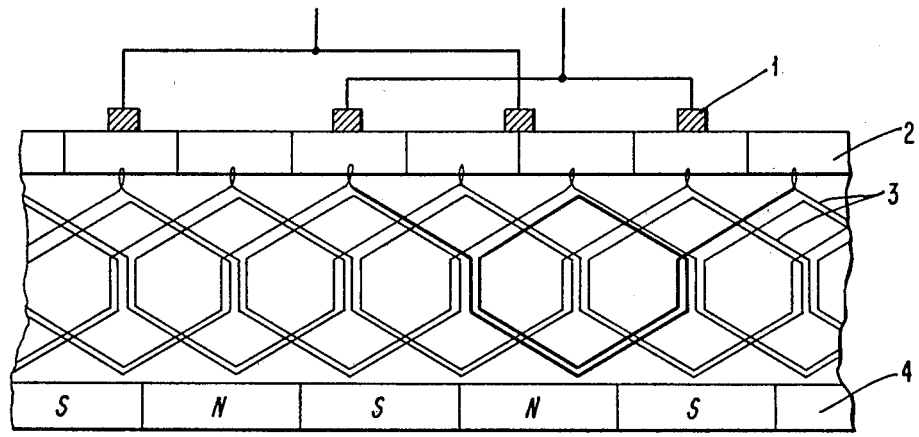
FIG. 7 is an expanded view of field magnets, armature windings formed in accordance with so-called wave winding arrangement, coil taps, a commutator, and brushes for a prior art cup type DC four-pole coreless motor.

On the other hand, where an armature is wound with so-called lap windings for use with a DC four-pole coreless motor, it is composed of six commutator segments, six armature coils, six armature coil taps, and four brushes as shown in FIG. 6.

Where an armature is wound with so-called wave windings for use with a DC four-pole coreless motor, it is composed of seven commutator segments, seven armature coils, seven armature coil taps, and four brushes as shown as shown in FIG. 7.

Therefore, according to the present invention, the efficiency of the armature, and of the motor can be greatly improved by employing a multi-pole system, resulting in making it possible to manufacture DC multi-pole electrodynamic devices, especially a cup type DC multi-pole coreless motor at lower cost due to the fact that the armature can be readily manufactured because a single conductor can be sequentially wound on the armature and commutator segments can be directly connected sequentially with armature coil taps; and that a DC multi-pole motor with a set of two brushes is obtained.

Therefore, according to the present invention, a highly efficient DC multi-pole electrodynamic device, especially a cup type DC multi-pole coreless motor can be manufactured at lower cost by the use of an inexpensive ferrite magnet with lower magnetic field strength instead of expensive permanent field magnets with high magnetic field strength such as those made of alnico or rare earth metal.

What is claimed is:

1. A DC multi-pole electrodynamic device, comprising:
    an annular array of fixed field magnets forming fixed magnetic field poles of alternating magnetic polarity around the array, respectively;
    magnetic material for closing magnetic circuits of said field magnets;
    an armature operatively disposed adjacent to said field magnets and mounted for rotation about an axis, said armature having a commutator composed of an annular array of commutator segments and a winding composed of a plurality of armature coils;
    a set of two brushes in electrical contact with respective commutator segments of said commutator to respectively provide electrical current of different electrical potential;
    a first one of said coils being formed by a single conductor having a first tap at one of its ends and a second tap at the other of its ends, each tap being electrically connected to respective first and second commutator segments, said first coil comprising a plurality of complete conductor turns around said armature with each turn having successive active armature portions of alternating magnetic polarity when energized adjacent to said successive ones of said magnetic field poles;
    a second one of said coils being formed by a single conductor having a third tap at one of its ends and a fourth tap at the other of its ends, each tap being electrically connected to respective third and fourth commutator segments, said second coil comprising a plurality of complete conductor turns around said armature with each turn having successive active armature portions of alternating magnetic polarity when energized adjacent to said successive ones of said magnetic field poles;
    said first one of said coils being in magnetic phase with said second one of said coils;
    said armature further including a conductive winding for connecting said second tap directly to said third tap so that their respective commutator segments will be at substantially the same potential when one is energized;
    all of said coils substantially identical, displaced about said axis with respect to their adjacent coils and separated pairs of said coils being in magnetic phase, said separated pairs being connected by a conductive winding in a like manner of said first and second coils; and
    the number of said taps being equal to one-half PZ, wherein P represents the number of said magnetic field poles and Z is the number of said armature coils.

2. A DC multi-pole motor according to claim 1, wherein said armature is coreless and cup-shaped;
    a first portion of said armature coils extending in a plane generally perpendicular to the rotational axis of said armature forming a closed end of said armature and the conductor of said first portion having conductor portions extending as chords generally perpendicular to a radius extending to said axis of rotation, and a second portion of said armature coils having conductor portions extending generally axially within a cylindrical surface forming the sides of the armature and the active conductor portions of said armature.

3. A cup type DC multi-pole motor according to claim 2, wherein said winding is a single continuous conductor wound sequentially on the armature to form all of said taps and all of said coils.

4. A cup type DC multi-pole coreless motor according to claim 2, wherein the number of magnetic field poles is 4 and the number of said coils is an odd number.

5. A multi-pole electrodynamic device according to claim 1, wherein said winding is a single continuous conductor wound sequentially on the armature to form all of said taps and all of said coils.

6. A multi-pole electrodynamic device according to claim 1, wherein the number of magnetic field poles is 4 and the number of said coils is an odd number.

* * * * *